United States Patent Office 3,116,298
Patented Dec. 31, 1963

3,116,298
PREPARATION OF DIOXEPINS
George B. Sterling, Midland, Mich., Edward J. Watson, Norwich, N.Y., and Chester E. Pawloski, Bay City, Mich., assignors to The Dow Chemical Company, Midland, Mich., a corporation of Delaware
No Drawing. Filed Jan. 3, 1961, Ser. No. 80,002
6 Claims. (Cl. 260—338)

The present invention relates to the preparation of substituted dioxepins and is more particularly concerned with the preparation of 1,3-dioxepins by the double exchange reaction of 2-butene-1,4-diol with a dialkoxyalkane and a carbonyl compound.

We have found that substituted 1,3-dioxepins may be conveniently prepared in high yield and purity by reacting 2-butene-1,4-diol with an appropriate dialkoxyalkane and a carbonyl compound in the presence of an acid catalyst and at a temperature of from about 20° to 100° C., preferably at room temperature or slightly above.

The reaction is illustrated as follows:

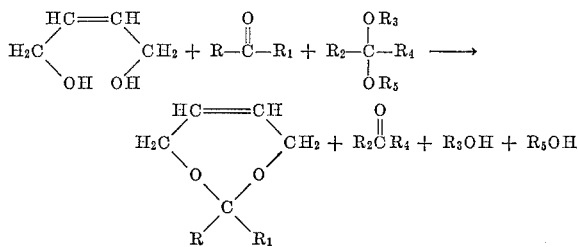

wherein R, $R_1$, $R_2$ and $R_4$ represent members of the group consisting of alkyl and halosubstituted alkyl groups containing up to 9 carbon atoms, aryl and haloaryl groups of the benzene series, alkenyl groups containing from 2 to 9 carbon atoms, hydrogen and cyclizing linear polymethylene units containing 2 to 3 carbon atoms; and $R_3$ and $R_5$ represent alkyl groups containing up to 9 carbon atoms.

Suitable carbonyl compounds, i.e. ketones and aldehydes, include, for example, acetophenone, chloroacetophenone, cyclohexanone, methyl ethyl ketone, acetaldehyde, formaldehyde, butyraldehyde, benzaldehyde, propionaldehyde, 5-hexene-2-one, bromo acetone, benzophenone, cyclopentanone, diethylketone, and the like.

Suitable alkoxy alkanes include, for example, 2,2-dimethoxypropane; 2,2-dimethoxybutane; 3,3-dimethoxypentane; 2,2-dibutoxypropane; 2-butoxy-2-methoxypropane; 1,1-diethoxyethane; dimethoxy cyclohexane; α,α-dimethoxy toluene and the like.

Approximately equimolar proportions of the butene diol, carbonyl compound, and alkoxyalkane may be employed although for best results approximately twice as much carbonyl compound and alkoxyalkane, molar basis, should be used. The carbonyl compound must be present in at least as great an amount as the alkoxyalkane, molar basis, to insure a good double exchange reaction.

Any strong non-oxidizing acidic catalyst may be employed such as, for example, sulfuric acid, dichloroacetic acid, phosphoric acid, trichloroacetic acid, dichloropropionic acid and the like.

The following examples further illustrate the present invention but are not to be construed as limiting.

EXAMPLE 1

A charge of 88 grams (1.0 mole) of 2-butene-1,4-diol; 104 grams (1.0 mole) of 2,2-dimethoxypropane; 44 grams (1.0 mole) of acetaldehyde; 200 milliliters of benzene and 1 drop of concentrated sulfuric acid was placed in a one liter flask. An exothermic reaction resulted in the formation of a single liquid phase. The solution was distilled at a 2:1 ratio until the pot temperature reached 91° C. after which it was allowed to cool, $Na_2CO_3$ was added and the distillation completed. The yield of 2-methyl-4,7-dihydro-1,3-dioxepin was 81%, B.P. 137–138° C. at 760 mm. pressure.

EXAMPLE 2

Following the procedure of Example 1 the following aldehydes or ketones were reacted with 2-butene-1,4-diol in the presence of the indicated alkoxyalkane. The results are summarized in the following table.

Table I

| Run | Aldehyde or Ketone | Alkoxyalkane | 4,7-Dihydro-1,3-Dioxepin | B.P., ° C. | Percent Yield |
|---|---|---|---|---|---|
| 1 | Paraformaldehyde | 2,2-dimethoxy propane | 4,7-dihydro-1,3-dioxepin | 124° C.—760 mm | 20 |
| 2 | Acetaldehyde | Dimethoxymethane | 2-methyl- | 137–138° C.—760 mm | 44 |
| 3 | n-Butyraldehyde | 2,2-dimethoxy propane | 2-propyl- | 88° C.—33 mm | 97 |
| 4 | Benzaldehyde | do | 2-phenyl- | 79° C.—0.6 mm | 80 |
| 5 | Propionaldehyde | do | 2-ethyl- | 95° C.—95 mm | 85 |
| 6 | Acetophenone | do | 2-methyl-2-phenyl- | | 24 |
| 7 | p-chloroacetophenone | do | 2-methyl-2-parachlorophenyl- | | 25 |
| 8 | Cyclohexanone | do | | 61° C.—0.9 mm | 88 |
| 9 | Methyl ethyl ketone | 2,2-dibutoxy propane | 2-ethyl-2-methyl- | 101° C.—89 mm | 63 |
| 10 | 5-Hexene-2-one | 2,2-dimethoxy propane | 2-methyl-2-but-1-ene- | 122° C.—30 mm | 48 |
| 11 | Benzophenone | do | 2,2-diphenyl- | 157° C.—1.2 mm | 27 |
| 12 | Cyclopentanone | do | | 107° C.—35 mm | 78 |
| 13 | Bromoacetone | do | 2-bromomethyl-2-methyl- | 116° C.—10 mm | 82 |

EXAMPLE 3

A charge of 5 moles of methyl ethyl ketone, 5 moles of 2-butene-1,4-diol, 10 moles of 2,2-dimethoxypropane and 1 drop of concentrated sulfuric acid was placed in a flask and distilled as in Example 1. A 47% yield of 2,2-dimethyl-4,7-dihydro-1,3-dioxepin was obtained with a 36% yield of 2-methyl-2-ethyl-4,7-dihydro-1,3-dioxepin.

EXAMPLE 4

The experiment of Example 3 was repeated using 5 moles of 2,2-dimethoxypropane and 1 liter of benzene as solvent. Yields were 46% for the 2,2-dimethyl-4,7-dihydro 1,3-dioxepin and 48% for 2-methyl-2-ethyl-4,7-dihydro-1,3-dioxepin.

Various modifications may be made in the present invention without departing from the spirit or scope thereof, and it is understood that we limit ourselves only as defined in the appended claims.

What is claimed is:

1. A method of preparing a 1,3-dioxepin which comprises reacting 2-butene-1,4-diol with a carbonyl compound selected from the group consisting of aldehydes and ketones having the formula:

wherein R and $R_1$ each represents a member of the group consisting of hydrogen, alkyl and haloalkyl radicals having up to 9 carbon atoms, phenyl and halophenyl radicals, and alkenyl radicals having from 2 to 9 carbon atoms in admixture with a dialkoxyalkane having the formula:

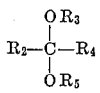

wherein $R_2$ and $R_4$ independently represent a member of the group consisting of hydrogen and alkyl radicals having up to 9 carbon atoms, and $R_3$ and $R_5$ independently represent an alkyl radical having up to 9 carbon atoms, and in the presence of a non-oxidizing acid catalyst.

2. Method of claim 1 wherein the alkoxyalkane is 2,2-dimethoxypropane.

3. Method of claim 2 wherein the carbonyl compound is an aldehyde.

4. A method for preparing 2-methyl-4,7-dihydro-1,3-dioxepin which comprises reacting 2-butene-1,4-diol with acetaldehyde and 2,2-dimethoxypropane in the presence of a non-oxiding acid catalyst.

5. A method for making 2-bromomethyl-2-methyl-4,7-dihydro-1,3-dioxepin which comprises reacting 2-butene-1,4-diol with bromoacetone and 2,2-dimethoxypropane in the presence of a non-oxidizing acid catalyst.

6. A method for making 2-methyl-2-(p-chlorophenyl)-4,7-dihydro-1,3-dioxepin which comprises reacting 2-butene-1,4-diol with p-chloroacetophenone and 2,2-dimethoxypropane in the presence of a non-oxidizing acid catalyst.

References Cited in the file of this patent

UNITED STATES PATENTS 2,071,252    Carothers _____ Feb. 16, 1937

OTHER REFERENCES

Lorette et al.: "J. Org. Chem." (volume 25, No. 4), page 525 (1960).